United States Patent [19]

Foerster et al.

[11] Patent Number: 4,472,745
[45] Date of Patent: Sep. 18, 1984

[54] METHOD AND APPARATUS FOR MAGNETIC TAPE RECORDING OF COLOR TELEVISION SIGNALS AND REPRODUCTION OF SUCH SIGNALS THEREFROM

[75] Inventors: Hubert Foerster, Darmstadt; Winfried Horstmann, Griesheim, both of Fed. Rep. of Germany

[73] Assignee: Robert Bosch GmbH, Fed. Rep. of Germany

[21] Appl. No.: 353,824

[22] Filed: Mar. 2, 1982

[30] Foreign Application Priority Data

Mar. 10, 1981 [DE] Fed. Rep. of Germany ....... 3109006

[51] Int. Cl.³ ............................................. H04N 9/491
[52] U.S. Cl. ...................................... 358/310; 358/330
[58] Field of Search ................................. 358/310, 330

[56] References Cited

U.S. PATENT DOCUMENTS

3,786,176  1/1974  Narahara et al. .................... 358/330
4,316,213  2/1982  Wharton et al. .................... 358/310
4,358,786 11/1982  Pfeiderer et al. ................... 358/310

*Primary Examiner*—Richard Murray
*Attorney, Agent, or Firm*—Frishauf, Holtz, Goodman & Woodward

[57] ABSTRACT

Color television signals are split up to provide a luminance signal and a chrominance signal. These are recombined in a manner designed to reduce the frequency bandwidth and, furthermore, time-subdivision is used to distribute signals for recording between two channels, with time expansion being provided in each channel before recording each channel on a separate track on the recording medium. In playback, the signals of the separate channels are time-compressed and then sequentially switched back into the original signal sequence. The time-expansion and distribution among channels can be performed after the color television signal has been rearranged to occupy smaller bandwidth or the components of the television signal can be separately time divided, distributed and time expanded in the recording technique, with the converse signal processing being performed in playback.

19 Claims, 9 Drawing Figures

METHOD AND APPARATUS FOR MAGNETIC TAPE RECORDING OF COLOR TELEVISION SIGNALS AND REPRODUCTION OF SUCH SIGNALS THEREFROM

This invention concerns a magnetic tape system for recording and reproducing color television signals in which time-expansion and compression techniques are used for reducing the frequencies of recorded signals.

BACKGROUND AND PRIOR ART

Continuing effort for increasing the storage density for color television signals recorded by magnetic tape apparatus has led to the introduction of a series of innovations from each of which a certain contribution towards raising the storage density of information on recordings has been provided. The known techniques thus developed can be roughly classed in two catagories: the first category of solutions to the problem is concerned with raising the usable frequency bandwidth of a given magnetic tape appratus or, for a similar purpose, the lowering of the necessary relative velocity between the magnetic record medium and the magnetic transducer or transducers while maintaining the upper frequency limit at all times. By diminution of the relevant dimensions of the magnetic transducers and improvement of the magnetic qualities of the record medium, it has been possible to a certain degree to reduce still further the smallest wavelengths that can be recorded, thus leading to the above-mentioned effect.

A further technique for improving the recording quality, while at the same time holding down the requirements on the mechanical and electrical properties of the magnetic tape equipment, is the process, for a long time conventional in the art, of frequency conversion of a chrominance signal modulated on an auxiliary carrier wave so as to place the signal into a frequency band adjacent to and below the lower frequency boundary of the frequencymodulated luminance signal. Such a process is known, for example, from DE-OS No. 18 08 439.

Another process for raising the storage density in the storage of signals on a magnetic tape is described in DE-OS No. 19 35 109. There the color television signals are separated into a luminance signal and a chrominance signal, and these components are then laid down in separate recording tracks by separate recording heads. The equipment is so designed that tracks of the first and second kind overlap each other at least partly, and in order to reduce cross-talk, the core gaps of the respective magnetic heads for the first and second kinds of tracks are set at an angle to each other with respect to the plane of the magnetic tape (azimuth-offset recording).

In DE-OS No. 14 74 268, a magnetic tape equipment for recording television signals is described in which the tape moves helical around a device of which a head wheel, with two diametrically oppositely lying magnetic heads, rotates. For suppression of the cross-talk that arises in recording without intermediate space between the individual tracks, the synchronizing pulses of neighboring tracks are so disposed that even in case of deviations of the magnetic heads from the track in playback, the synchronizing of the reproduced picture is not persistently impaired. The interrelations involved in the alignment of the synchronizing pulses are also described in an article by F. T. Backers and J. H. Wissels entitled "An Experimental Apparatus for Recording Television Signals on Magnetic Tape" in Philips Technical Review, Vol. 24, No. pp. 81–83 (1962).

From DE-OS No. 26 29 706, a method for transmitting and/or recording of color television signals is also known in which the color information is compressed in time and is transmitted and/or recorded line by line during the horizontal blanking interval. In this manner a broad band luminance signal is preserved and reliable synchronization is made possible. That known method offers an improvement of the resolution with only slight color errors. The luminance information is recorded and/or transmitted during about 80% of the horizontal line scan period and the color signal is recorded and/or transmitted in time-compressed form, line by line, during the horizontal blanking interval of a normal television signal. The color signals, moreover, are recorded or transmitted during the largest part of the remaining 20% of the line scan period and during a time interval that is small compared to the interval available for transmission of the color signal, a blanking signal is transmitted of a value that indicates the hueless value of the color signals. According to an embodiment of the known method, in every second line a blanking signal is transmitted and in the lines between them a synchronizing pulse is transmitted. This process has the advantage that the amplitude errors arising in transmission and/or recording make themselves noticed in all cases as color saturation errors, but not as color hue errors. Furthermore, a sufficient degree of synchronization is made possible, and by means of the synchronizing pulses the switches necessary in reproduction for the color difference signals can be synchronized.

It is finally known from DE-OS No. 27 45 337 to reduce the bandwidth requirements in recording of broadband signals by subdividing these signals on a time division basis successively in groups of n subdivisions and to record them in a plurality of channels. This system, however, involves dynamic storage with many parallel tracks running lengthwise of the magnetic tape.

THE INVENTION

It is an object of the present invention to provide a system of high density recording of color television signals that is capable of use with recording and reproduction equipment involving record tracks running obliquely across the magnetic tape record medium and which does not impose costly mechanical and electrical requirements on the recording and reproduction equipment associated with the magnetic tape.

Briefly, the color television signals are split and rearranged, as further described, and subdivided by time division for recording in at least two separate channels with time expansion for frequency reduction. The signals so recorded are then time-compressed and cyclically read out of the channels to provide a continuous flow of signals, and the signals are also rearranged back into their original form and frequency range and combined as necessary to provide a normal color television signal for processing in further reproduction stages.

In a first embodiment, the color television signal is first split to provide a luminance signal and a chrominance signal, the former then being modulated onto a carrier frequency and the latter shifted by frequency conversion into a frequency region adjoining the lower frequency limit of the modulated carrier luminance signal. These two signal components are then combined by superposition, followed by subjecting them to time division with distribution of the subdivided signal segments into at least two recording channels in which they are time-expanded by a factor equal to the number of channels and then recorded on the tape by separate heads or separate pairs of diametrically opposed heads. In reproduction, the signals are picked up in separate channels, time compressed and then cyclically sequenced to provide a continuous flow of signals, from which the luminance signal is separated and demodulated and the chrominance signal is converted back to the original frequency range, after which the two signal components are put back together again to form a composite color television signal of the original kind.

In a second embodiment, instead of frequency shifting the chrominance signal and superimposing it upon a frequency modulated luminance signal, the color television signal is encoded by time-compressing at least the chrominance signal and timedisplacing it so as to insert it in the blanking intervals between the luminance signals of the television lines. The thus encoded signal is then frequency modulated on a carrier, after which time division, distribution to channels and time-expansion, etc., is performed as in the case of the first embodiment, with the reverse operations taking place in reproduction. In a third embodiment after the signal is split to provide a luminance signal and a signal, the signal is frequency shifted, as in the case of the first embodiment, but the two components of the signal are each individually time-divided, distributed to channels and time expanded, and then the signal segments of the luminance component in their separate channels are modulated onto a carrier frequency, after which these modulated signals are added to the corresponding signals with the resulting combinations in the several channels then being recorded on separate tracks for each channel, the reverse operations then being performed on reproduction.

In a fourth embodiment, the color composite television signal is first encoded as in the second embodiment, and the signal thus encoded is subjected to time division, distribution into channels and time-expansion, after which in each channel it is modulated onto a carrier frequency for recording, again with the reverse of these various transformations being done in reproduction. Finally, it is possible for the time division and channel distribution rate, instead of corresponding to distributing entire television line portions of signals in sequence, may correspond to the rate of succession of picture points on a line, the point rate necessary to provide the desired degree of resolution, so that successive picture points are in different channels. In this case, it is necessary to filter out the switching frequency before frequency modulating the time-expanded signals onto a carrier in each channel. This high rate of switching is provided for both the chrominance and the luminance components, and the encoding or separation and recombination of chrominance and luminance components may be handled as in any of the first four embodiments.

The system of the invention has the advantage that the storage density of signals on the recording medium is further increased compared to the prior art. There is the further advantage that cross-talk between recording channels is reduced, particularly if azimuth-offset recording is used and, furthermore, it is possible to provide slow-motion and fast motion reproduction of television pictures by combining known methods for so doing with the present system.

The apparatus requirements for the system are economical to provide.

BRIEF DESCRIPTION OF THE DRAWINGS

The invention is further described by way of illustrative example with reference to the annexed drawings in which.

DESCRIPTION OF THE ILLUSTRATED EMBODIMENT

Figure 1:
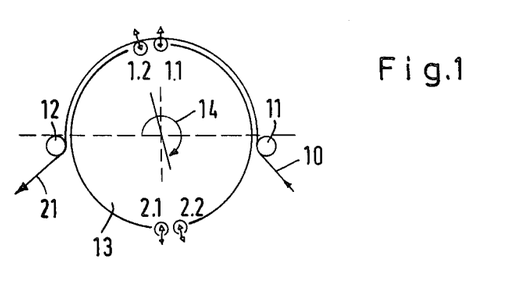
FIG. 1 is a diagram of a headwheel for a magnetic recording and reproducing system according to the invention, viewed in the direction of the axis of the wheel.

In FIG. 1 a magnetic tape 10 is so guided around and in contact with, a head wheel 13, by guide rollers 11 and 12 that change the direction of movement of the tape, that the moving tape is always against, or close to the head wheel over about 180° of the circumference of the ladder. In thus passing around the head wheel the magnetic tape 10 forms a half turn of a helix, so that the magnet heads 1.1, 1.2, 2.1 and 2.2 disposed on the head wheel 13 describe a succession of track sections disposed obliquely to the edge of the tape and offset from each other just enough to make full use of the tape surface. The relations between these tracks and the various magnetic heads is further described in the next paragraph with reference to FIG. 2. Each of the magnetic heads arrayed on the head wheel 13 is connected to a recording or reproduction channel. Each pair of diametrically opposite magnet heads is also so interconnected that they either receive signals for recording simultaneously or pick up the same succession of signals during playback from the magnetic tape.

Figure 2:
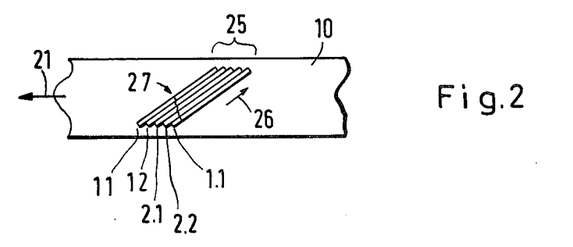
FIG. 2 is a diagram of the disposition of recording tracks on a magnetic tape as produced with the use of a head wheel as shown in FIG. 1.

In order further to suppress cross talk interference between neighboring track sections, thus from one channel to the other, the track arrangement should be so constituted that, as shown in FIG. 2 at 27, the synchronizing portions in the signal which are distinguished by high amplitude values, and by the same frequencies, should lie near each other.

Figure 3:
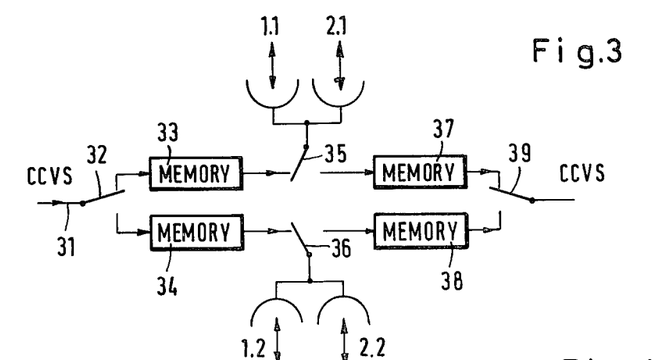
FIG. 3 is a basic block diagram illustrating the principle of operation of the signal storage system utilized in the recording and reproducing system of the invention.

The storage system utilized in the invention is illustrated in the diagram shown in FIG. 3. The input color composite television signal at 31 is alternately provided to two storage means 33 and 34 through a switch 32.

The switching frequency of the switch 32 has half the value as the line frequency of the color television signal that is to be recorded. In consequence, after one line is stored in the storage unit 33, the next line is written into the storage unit 34, and so on. For the reading out of the signal portions, each corresponding to one line length, stored in the storage units 33 and 34, a "clock" rate is chosen which is only half that used for writing into the storage unit. Consequently, the read out process lasts twice as long and the individual signal segments are thus expanded in time.

The switches 35 and 36 are set in the positions indicated in FIG. 3 during the recording mode of operation. The signal segments read out of the storage unit 33 are accordingly supplied to the recording channel which includes the magnetic heads 1.1 and 1.2 while the signals read out of the storage unit 34 are supplied to the recording channel that contains the magnetic heads 1.2 and 2.2.

In the reproduction or playback mode of operation, the switches 35 and 36 are put into their other positions (i.e. the position not shown in the drawing), so that the information picked up from the magnetic tape by the heads 1.1 and 2.1 of the first recording channel are supplied to the storage unit 37, while the magnetic information of the other channel proceeds from the magnetic heads 1.2 and 2.2 through the switch 36 into the storage unit 38. The writing of the signals into the storage units 37 and 38 takes place at the same clock rate at which the signals were read out of the storage units 33 and 34, while the reading out from the storage units 37 and 38 takes place at a clock rate twice as high, thus, at the same rate at which the original signal sections were written into the storage units 33 and 34. The signals read out of the magnetic tape are accordingly compressed in the storage units 37 and put together into a continuous signal train by the switch 39, so that the signals will correspond in appearance to the original signals at the input 31. As a result of the time transformation processes in the storage units 33,34 and 37,38 the outgoing color television signal is subjected in reproduction by a basic delay as is evident from the timing diagram given in FIG. 4.

Figure 4:
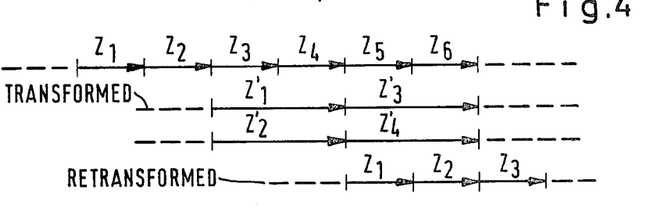
FIG. 4 is a timing diagram illustrating the time relation between signal-processing steps resulting from the use of the storage system of FIG. 3.

In FIG. 4 the signal segments accepted at 31 (FIG. 3) are designated progressively as $Z_1$, $Z_2$, $Z_3$ etc.. After running through the storage units 33 and 34 there is a two-channel signal flow of the form in which there is present in one channel the signal sections $Z'_1$, $Z'_3$, etc., which in the meanwhile were expanded and in the other channel the likewise time-expanded signal segments $Z'_2$, $Z'_4$, etc.. It is not necessary for the signal segments in the two parallel channels to be absolutely synchronized. The signal segments of one channel could also be offset in time compared to those of the other channel. In playback the signal segments recorded in the two parallel channels are compressed and are put back together again into a continuous signal sequence $Z_1$, $Z_2$, $Z_3$ etc. by the switch 39 (FIG. 3).

Figure 5:
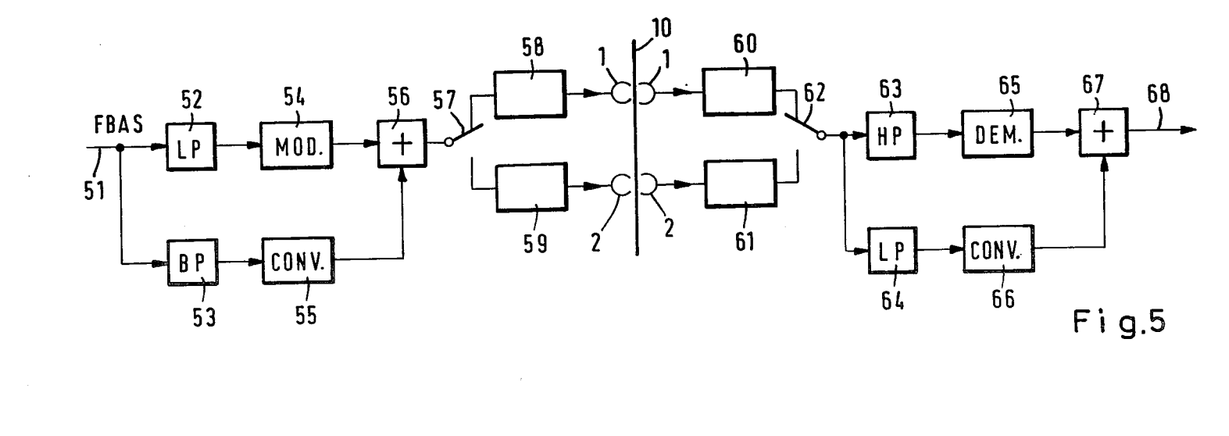
FIG. 5 is a block circuit diagram of an illustrative embodiment of a system according to the invention.

The circuit shown in FIG. 5 contains a low pass filter 52 and a bandpass filter 53, which are connected to a common input 51. In passing through the LPF 52 the luminance signal is separated out from the color television composite signal and it is thereafter supplied to a modulator 54 where it modulates a carrier frequency for the luminance signal. The output of the modulator 54 is connected to one input of an adding stage 56.

The composite color television signal present at the input 51 is also supplied to the bandpass filter 53 in which the chrominance signal is separated. The separated chrominance signal is put through a converter 55 in which it is shifted to a frequency region that lies adjacently below the lowest frequency of the luminance signal. The output of the converter 55 is connected to the second input of the adding stage 56. The frequency modulated luminance signal and the frequency shifted chrominance signal are added in the adding stage 56. At the output of the adding stage 56 is the switch 57 that, alternating line by line, supplies the output of the adding stage 56 to the storage units 58 and 59. The writing in of the signal segments into the storage units 58 and 59 takes place at a clock frequency which is at least twice the highest frequency to be possibly found in the output signal of the adding stage 56. The reading out of the signal segments from the storage units 58 and 59, on the other hand, takes place at a clock frequency that is exactly half of the writing clock frequency. As a result, the signal segments alternately supplied to the storage units 58 and 59 are expanded in reading them out to twice their original length in time. In consequence, there is present at the output of each of the storage units 58 and 59 an uninterrupted signal sequence. These are recorded by the magnetic heads on the magnetic tape 10.

For reasons of simplified representation, in FIG. 5 only one magnetic head is shown at the output of each storage unit, although as described in connection with FIGS. 1 to 4, because of the 180° encirclement of the head-wheel, there must be two diametrically opposite magnetic heads connected in each channel.

In the reproduction or playback mode of operation, the same magnetic heads serve to pick up the signals stored magnetically on the tape 10. These signals out of channel 1 are written into the storage unit 60, while those from channel 2 are written into the storage unit 61, in each case at a clock rate that corresponds exactly to the clock rate at which the signal segments were read out of the storage units 58 and 59. By means of a switch 62, which alternately connects the storage units 60 and 61 to a common output, the signal segments at the outputs of the storage units 60 and 61 are put together into a continuous signal, with the reading out of the signal segments from the storage unit 61 proceeding at exactly the same clock rate with which the signals were written into the storage units 58 and 59. At the output of the switch 62 there is thus a signal present that corresponds exactly to the one fed into the switch 57. The signal from the output of the switch 62 proceeds on the one hand into a high pass filter for separating the carrier frequency signal which contains the luminance signal and on the other hand through a low pass filter 64 for separating out the frequency shifted chrominance signal.

At the output of the HPF 63 there is connected the input of a demodulator 65 in which the luminance signal is recovered and the latter is then supplied to an adding stage 67. The frequency shifted chrominance signal separated out by the LPF 64 is shifted back into the original frequency range in a converter 66 and supplied into the second input of the adding stage 67. At the output 68 of the adding stage 67 the composite color television signal is then again made available.

Figure 6:
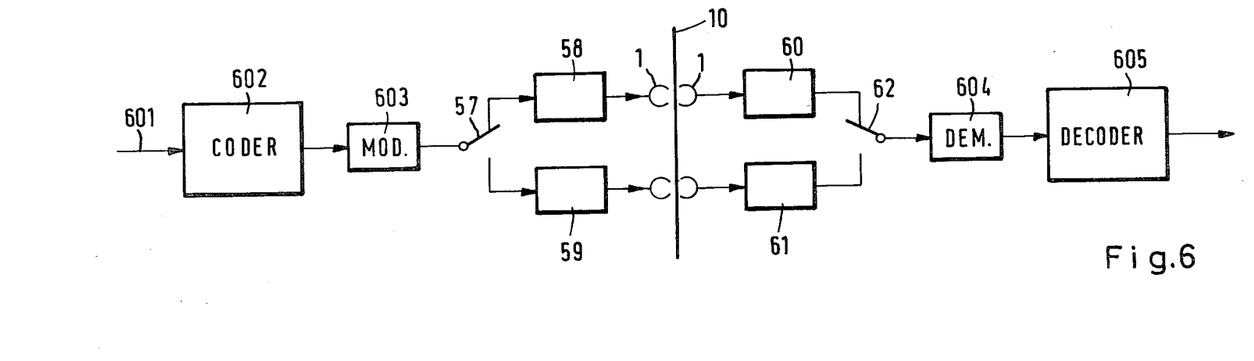
FIG. 6 is a block circuit diagram of another illustrative embodiment of a system according to the invention.

In FIG. 6 the constitution and manner of operation of the switches 57 and 62, the storage units 58, 59, 60 and 61, the magnetic heads 1 and 2 and the magnetic tape 10 correspond completely to those of FIG. 1. These circuit elements are accordingly designated in FIG. 6 with the same reference numerals. The signal processing in the case of FIG. 6 is distinguished from that in FIG. 5 in that the composite color television signal supplied at the input 601 is first passed through a coding stage 602 in which the chrominance signal is compressed in time and is put into the blanking intervals of the luminance signal.

The composite signal from the output of the coder 602 is modulated onto a carrier frequency in the modulator 603 after which the modulated signal proceeds to the switch 57 and is recorded on the magnetic tape 10 in the manner above-described. In playback the signals recorded on the magnetic tape 10, after reaching the stage of being put together from the two-channel recording into a single channel flow of signals at the output of the switch 62, are supplied to the demodulator 604 for demodulation of the modulated carrier signals. At the output of the demodulator 604 the signal mixture proceeds to a decoding stage 605, in which the time-compressed chrominance signal that had been placed in the blanking intervals of the luminance signal is again expanded in time and mixed with the luminance signal. The signal at the output of the decoding stage 605 again corresponds fully to the input signal at 601.

Figure 7:
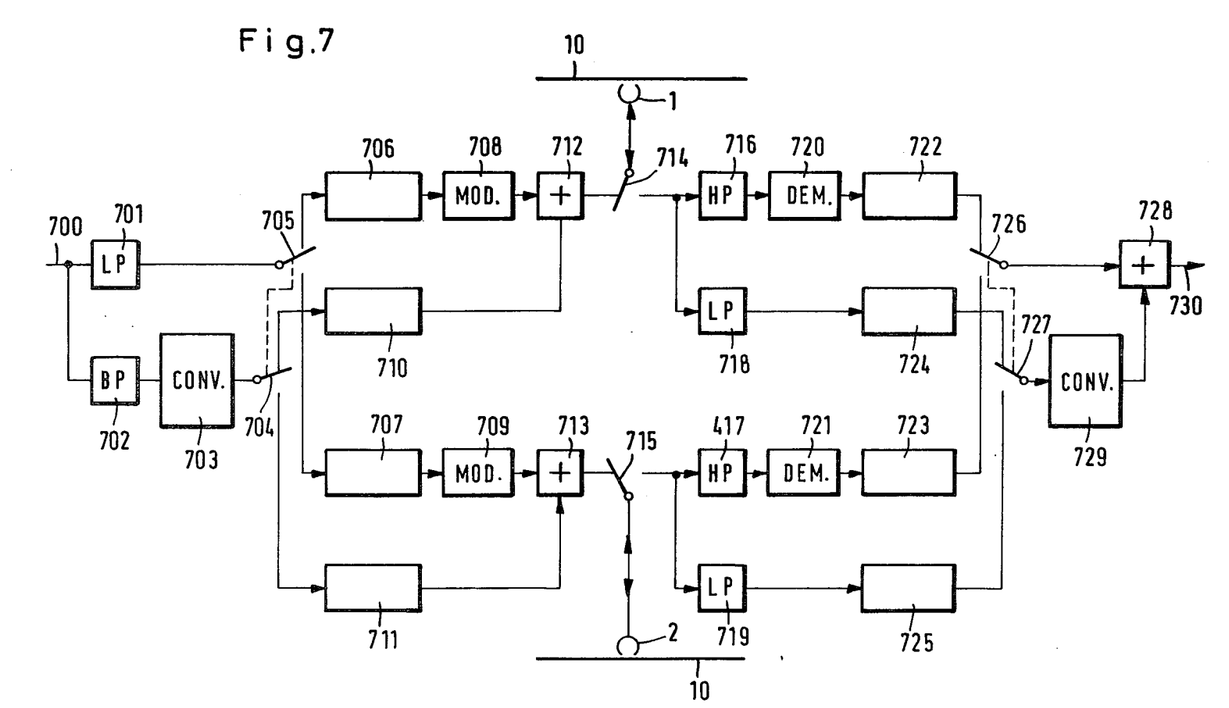
FIG. 7 is a block circuit diagram of a third illustrative embodiment of a system according to the invention, in this case with a modified storage system.

The signal processing in the circuit of FIG. 7 takes place in a manner similar to that of FIG. 5, with the difference, however, that the time-base change of the signal segments is made in the video frequency range, i.e. before modulation in the case of recording and after demodulation in the case of playback. The circuit accordingly has a low pass filter 701 for separating the luminance signal and bandpass filter 702 for separating the chrominance signal. Both filters are supplied from the input 700 with the signals to be processed. In the signal path of the chrominance signal there is, following the bandpass filter 702 a converter unit 703 for shifting the frequency of the chrominance signal into a frequency range lying just below the lower limits of the luminance signal frequency range. At the output of the converter 703 is a switch 704 and likewise at the output of the LPF 701 is a switch 705, both of these being switched over and back at half of the frequency at which the signal segments follow each other. In consequence, the signal segments with the luminance signal coming out of the LPF 701 are alternately put into the storage units 706 and 707. In these storage units the signal segments are written in at so high a clock rate that the reconstruction of the original signal is possible. In general, this clock rate is equal, at the least, to twice the highest frequency likely to appear in the input signal. The reading out of the signal segments from the storage units 706 and 707 follows at a clock rate that is exactly half that of the writing clock rate, so that the signal segments are accordingly stretched out to twice the time length after the read out. At the output of the storage unit 706 is a modulator 708 in which the time expanded signal segments of the luminance signal are modulated onto a carrier frequency. In the same way, the signal segments from the output of the storage unit 707 are frequency modulated in a modulator 709.

The signal segments with the color information proceeding out of the frequency converter 703 are alternately supplied by the switch 704 to the storage units 710 and 711. In these storage units the chrominance signals are written in and read out at different clock rates in the same manner as was the case with the luminance signal, so that the signals coming out of the storage units 710 and 711 are stretched out to twice their original time length and thus constitute an uninterrupted flow of signals. The frequency-modulated time-expanded luminance signal proceeds from the output of the modulation stage 708 to the input of an adding stage 712, while from the output of the storage unit 710 the frequency-shifted and time-expanded chrominance signals proceed to the second input of the adding stage 712. In the latter the two signals are united and are supplied, in the case of recording (when the switch 714 is in the position shown in the drawing) to the signal coil of the magnetic transducer 1 which converts the information supplied to it into changes in the magnetization of the tape 10.

In the same way the frequency-modulated luminance signals and the frequency-shifted time-expanded chrominance signals of the other recording channel are added in the adding stage 713, pass through the switch 715 when set in the illustrated position for recording, to the magnetic transducer 2 that records them on the magnetic tape 10.

In playback the switches 714 and 715 are both in their other positions which are not the ones shown in the drawings, so that the magnetization changes of the magnetic tape 10 are picked up by the magnetic transducers 1 and 2 and supplied as electrical signals to the inputs of the frequency filters 716, 717, 718 and 719. The signals picked up from the magnetic tape 10 by the magnetic head 1 are simultaneously supplied to the high pass filter 716 and the low pass filter 718. The demodulation stage 720 at the output of the HPF 716 converts the frequency-modulated time-expanded luminance signal into a time-expanded video luminance signal which is written into the storage unit 722 at a clock rate that corresponds to the clock rate for read out from the storage unit 706. The time-expanded signal separated by the low pass filter 718 is in a similar way supplied to the storage unit 724 and there also written into it at the clock rate used for reading the recording signals out of the storage unit 710. In the same manner the signals picked up in playback into the second recording channel by the magnetic head 2 are supplied through the switch 715 to the high pass filter 717 are then transferred to the video frequency range in the demodulator 721 and, in a manner analagous to the signal processing in the first recording channel, are written into the storage unit 723. The frequency-shifted chrominance signals separated by the low pass filter 719 reaches the storage unit 725 and is there likewise written in at a clock rate that corresponds to the rate for reading out from the storage unit 711. The signals are read out of the storage units 722 and 723 at a rate raised to twice the writing-in rate. In consequence, the length in time of the signal segments is shortened back to the original dimension and the signal segments which now contain the luminance signal can be supplied to the adding stage 728 through the switch 726. The reading out of the storage units 724 and 725 takes place in an analagous manner, likewise with the doubled clock rate, so that the signal segments that contain the signals shifted in frequency are alternately taken from the storage units 724 and 725 through the switch 727 and supplied to the frequency shifter 729. In the latter the chrominance signals are converted back to their original frequency, after which they are supplied to the second input of the adding stage 728, so that the signal at the output 730 of the adding stage 728 at last corresponds to the original signal that was present at the input 700.

Figure 8:
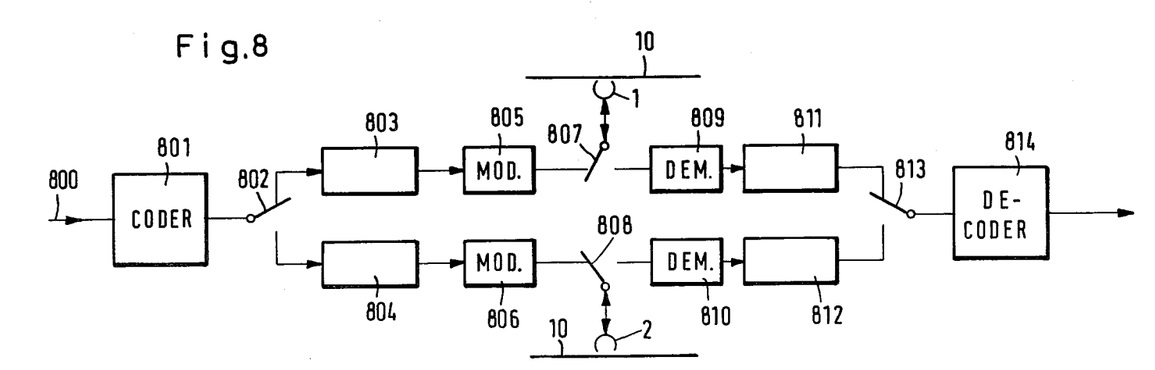
FIG. 8 is a block circuit diagram of an embodiment similar to that of FIG. 6, but with a different storage system.

The signal processing for the color composite television signal proceeds in FIG. 8 in a manner similar to the operation of the circuit of FIG. 6, but in the case of FIG. 8 the time-base change is provided in each case in the video frequency range. The color television signal entering the circuit at the input 800 is first subjected to coding in the coder 801 for the purpose of time-shifting a time-compressed chrominance signal into the blanking intervals of the luminance signal. The luminance signal can in such case be either uninfluenced with respect to time or can be slightly compressed in time in order to magnify the duration of the blanking intervals. The coded signal proceeds from the output of the coder 801 to the switch 802 which distributes the signal segments alternating at the appropriately selected frequency to the two recording channels. The signal segments proceed from the switch 802 to the storage units 803 and 804 in which they are expanded to twice the original time duration. Modulators 805 and 806 are connected to the respective outputs of the storage units 803 and 804. In these modulators the signal segments containing the coded color television signal frequency modulate a carrier frequency. The signals proceed through the switches 807 and 802 to the magnetic heads 1 and 2 for recording on the magnetic tape 10.

In playback the switches 807 and 808 are set in their other positions which are not the ones shown in the drawing, so that the signal transducers 1 and 2 are respectively connected with the demodulation stages 809 and 810. The coded time-expanded signals then go into the storage units 811 and 812 from which they are picked up in their original time length through the switch 813, alternately from the storage units 811 and 812, after which they are decoded in the decoder 814 where the chrominance signal is combined with the luminance signal in its original form. At the output 815 of the decoder 814 a color television signal corresponding to the transmission standards is again present.

Figure 9:
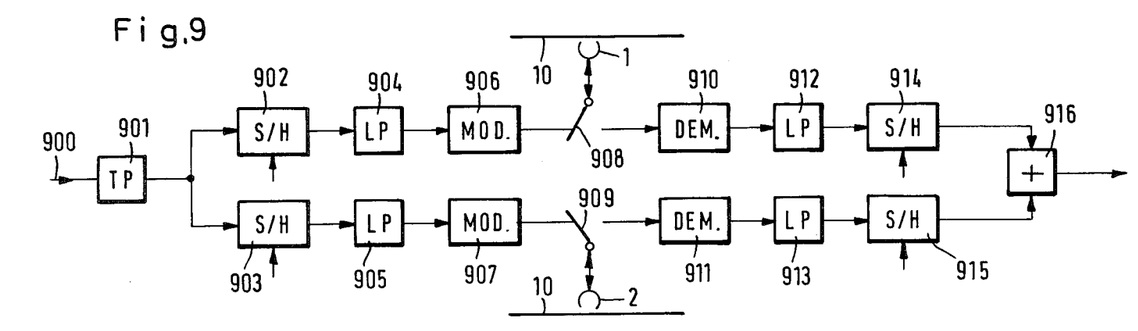
FIG. 9 is a block circuit diagram of still another illustrative embodiment of a system according to the invention, in this case in which signal subdivision by picture points is provided.

In similar way a frequency reduction in recording is produced in the circuit of FIG. 9. Here a composite signal entering at 900 is filtered in the low pass filter 901 and is furnished to the scan and hold circuits 902 and 903. By corresponding choice of phase and frequency of the sample and hold circuits 902 and 903 individual picture elements, for example, picture points, are alternately picked up by the two circuits. Thus, all even-numbered picture picture points can be picked up and held by the circuit 902 and all odd-numbered picture points picked up and held by the circuit 903. The thus sampled signals are run through the low pass filters 904 and 905 in their respective channels for suppressing the sampling frequency. The thus "cleaned" sample values are frequency modulated onto carriers in the modulators 906 and 907 and recorded by the magnetic heads 1 and 2 on the tape 10 in the manner already described.

In playback the switches 908 and 909 which remain during recording operation in the positions shown in FIG. 9, are now in the other switch position and thus connect the coils of the respective magnetic head 1 and 2 with the demodulators 910 and 911 respectively. The demodulated sampled values are put through low pass filtering in the LPFs 912 and 913 and are then alternately picked up in the sample and hold circuits 914 and 915. The signal values at the output of the sample and hold circuits 914 and 915 then proceed to the respective inputs of the adding stage 916 and are there combined to provide the original composite signal.

Although the invention has been described with reference to particular illustrative examples for explanation of the invention, it will be understood that the invention is not limited to these examples and that other modifications and variations are possible within the inventive concept. In particular, the separately shown signal processing stages in the recording and playback channels having the same function could also be constituted by components serving both in recording and in playback provided with corresponding switching devices for the changeover from recording to reproduction operation.

It should be explained that for brevity of language the expression "modulating a signal onto a carrier frequency" is used to mean modulating a carrier wave with the signal in question. Likewise, reference is made to shifting the frequency of the chrominance component of a signal by frequency conversion, which accords with ordinary technical language. It is of course a fact that frequency conversion is a form of modulation in which the carrier is suppressed and usually only one of the side band products is used.

The time compression used in reproducing a signal is referred to for brevity as being the reciprocal of the time expansion used in recording, corresponding with ordinary language, although it would be more correct to say that the time-base change in reproducing a signal is by a factor that is the reciprocal of the factor of time-base change used in recording. It is of course not intended to introduce a "double negative" by referring to expanding and compression and also to a reciprocal relation.

It should be noted that it is desirable for each of the recorded oblique tracks shown in FIG. 2 to contain at least one television field (half picture).

I claim:

1. Method of recording color television signals comprising the steps of:
splitting a first composite color television signal into luminance and chrominance components;
modulating said luminance component onto a carrier frequency to produce a frequency modulated luminance signal;
shifting the frequency, by frequency conversion, of said chrominance component to a frequency range adjoining the lower frequency boundary of the frequency range of said modulated luminance signal;
combining said frequency-shifted chrominance component and said modulated luminance signal, by superimposition in a common signal channel, to form a second composite color television signal;
subdividing said second composite color television signal by time division at a predetermined periodicity and distributing the subdivided signal segments cyclically in synchronism with said periodicity to at least two recording channels;
time-expanding said distributed signal segments in their respective channels by a factor equal to the number of said channels; and
recording said segments substantially contemporaneously in sets of parallel tracks on a magnetic tape, the tracks of each set corresponding to the respective channels in which time-expanded signal segments are distributed.

2. Method of reproducing color television signals recorded by the method of claim 1, comprising the steps of:
picking up substantially contemporaneously the signals recorded on a plurality of tracks respectively in a corresponding plurality of pick-up channels;

time-compressing the picked-up signals segments in each of said pick-up channels by a factor which is the reciprocal of the expansion factor used in the recording method;

sequencing the time-compressed signals in said channels cyclically in a predetermined order to form a single-channel continuous flow of picked-up signals;

separating, by frequency-range filtering, the luminance component and the chrominance component from said continuous flow of picked-up signals;

demodulating said luminance component;

frequency-shifting said chrominance component to its normal frequency in a standard composite color television signal, and combining said demodulated luminance component and said frequency-shifted chrominance component to produce a normal composite color television signal.

3. Method of recording color television signals comprising the steps of:

encoding a color television signal by separating the luminance component and chrominance component thereof, time-compressing at least the chrominance component and timedisplacing the chrominance component of each television line into an adjacent line blanking interval of the luminance component;

modulating said encoded signal onto a carrier frequency to produce a modulated wave signal;

subdividing said modulated signal by time division with a predetermined periodicity and distributing the subdivided signal segments cyclically in synchronism with said periodicity to at least two recording channels;

time-expanding said distributed signal segments in their respective channels by a factor equal to the number of said channels, and recording said segments substantially contemporaneously in sets of parallel tracks on a magnetic tape, the tracks of each set corresponding to the respective channels in which said time-expanded signal segments are distributed.

4. Method of reproducing color television signals recorded by the method of claim 3, comprising the steps of:

picking up substantially contemporaneously, the signals recorded on a plurality of tracks respectively in a corresponding plurality of pick-up channels;

time-compressing the picked-up signals in each of said pick-up channels by a factor which is the reciprocal of the expansion factor used in the recording method;

sequencing the time-compressed signal segments in said channels cyclically in a predetermined order to form a singlechannel continuous flow of picked-up signals;

demodulating said continuous flow of picked-up signals to obtain time-encoded composite television signals;

decoding said time-encoded composite television signals by time-division separation of the color component segments thereof situated in the blanking intervals of the luminance component thereof, time-expanding at least said color component segments and displacing said expanded color component segments for superposition spread over said luminance components, and combining, by superposition, said expanded color component segments with corresponding luminance component segments to produce a normal composite television signal.

5. Method of recording color television signals comprising the steps of:

splitting a first composite color television signal into luminance and chrominance components;

shifting the frequency, by frequency conversion, of said chrominance component to a frequency range adjoining the lower frequency boundary of the frequency range of said luminance signal;

subdividing said luminance component by time division with a predetermined periodicity and distributing the subdivided signal segments cylically in synchronism with said periodicity to at least two recording channels and also subdividing said color hue component by time division with the same periodicity and distributing the subdivided signal segments cyclically in synchronism with said periodicity to the same number of additional recording channels;

time-expanding said distributed signal segments in their respective channels by a factor equal to the number of said channels for each component, modulating the signal segments of said luminance component onto a carrier frequency and adding the signal segments of said color hue component of the corresponding channel to said modulated signal to provide a new combined television signal in each of a plurality of channels, and recording the new combined television signals of said channels substantially contemporaneously in adjacent tracks on a magnetic tape.

6. Method of reproducing color television signals recorded by the method of claim 5, coprising the steps of:

picking up substantially contemporaneously the signals recorded on a plurality of tracks respectively in a corresponding plurality of pick-up channels;

separating the combined television signals picked up in said channels into luminance and chrominance components;

demodulating said luminance components;

subjecting both said demodulated luminance components and said chrominance components to a time-compression in each channel which is the reciprocal of the time-expansion used in said recording method;

sequencing the time-compressed signals in said channels cyclically in the case of said luminance signal and said chrominance signal separately and thereby providing a continuous flow of time-compressed signals of each component;

frequency-shifting said chrominance component to its normal frequency in a standard composite color television signal, and combining said luminance component and said frequency-shifted chrominance component to produce a normal composite color television signal.

7. A method of recording color television signals comprising the steps of:

encoding a color television signal by separating the luminance component and the chrominance component thereof, time-compressing at least the chrominance component and time-displacing the chrominance component of each television line into an adjacent line blanking interval of the luminance component;

subdividing said encoded signal by time division at a predetermined periodicity and distributing the subdivided signal elements cyclically in synchronism with said periodicity to at least two recording channels;

time-expanding said distributed signal elements in their respective channels by a factor equal to the number of said channels;

modulating the time-expanded signals in each channel onto a carrier frequency, and recording the modulated signals in said channels substantially contemporaneously in sets of adjacent parallel tracks on a magnetic tape, the tracks of each set corresponding to the respective channels in which said time-expanded signal segments are distributed.

8. Method of reproducing color television signals recorded by the method of claim 7, comprising the steps of:

picking up substantially contemporaneously the signals recorded on a plurality of tracks respectively in a corresponding plurality of pick-up channels;

demodulating the picked-up signals in each channel;

time-compressing the demodulated picked-up signals in each of said pick-up channels by the reciprocal of the time-expansion used in said recording method;

sequencing the time-compressed signals of said channels cyclically in a predetermined order and thereby forming a single-channel continuous flow of demodulated picked-up signals;

decoding said time-encoded composite television signals by time division separation of the chrominance component segments thereof situated in the blanking intervals of the luminance component thereof, time-expanding at least said chrominance component segments and displacing said expanded chrominance component segments for superposition spread over said luminance components, and combining, by superposition, said expanded chrominance component segments with corresponding luminance component segments to produce a normal color composite television signal.

9. Method of recording color television signals as defined in claim 1, 3, 5 or 7 in which the periodicity of subdivision into signal segments and distribution of said segments provides subdivided segments corresponding to an integral number of television line scan intervals.

10. Method of reproducing color television signals as defined in claim 2,4,6 or 8 in which the sequencing of the time-compressed signals respectively provided in said pick-up channels cyclically in predetermined order at a rate corresponding to sequencing signal segments from each channel in turn which correspond to an integral number of television line scan intervals.

11. Method of recording color television signals as defined in claim 1,3,5 or 7 in which the periodicity of subdivision into signal segments and distribution of said segments to a plurality of channels corresponds to the rate of succession of picture point elements in a television line.

12. Method of reproducing color television signals as defined in claim 2,4,6 or 8 in which the sequencing of the time-compresssed signals respectively provided in said pick-up channels, cyclically in predetermined order, is at the rate of succession of picture points in a television line.

13. Apparatus for recording color television signals a magnetic tape by the method set forth in claim 1 and for reproducing color television signals so recorded from a magnetic tape comprising:

filter means for separating the luminance and chrominance components of a television signal;

means for modulating the separated luminance signal onto a carrier frequency;

frequency converter means for shifting the frequency of said chrominance component to a region adjacent and below the frequency region of said luminance component;

signal addition means for combining the carrier modulated luminance component and the frequency shifted chrominance component;

first switching means for subdividing the combining signal and distributing segments thereof of equal duration alternately to first and second recording channels;

storage means for time-expanding the signals in said first and second recording channels for frequency reduction thereof;

magnet heads for each of said channels for recording the frequency-reduced signals on a moving tape;

second switching means for switching over from recording to reproducing mode of operation;

first and second pick-up channels for connection to said magnet heads through said second switching means in pick-up mode of operation;

storage means in each of said pick-up channels for time-compressing the signals in said pick-up channels for frequency increase which is reciprocal to the frequency reduction in recording;

third switching means for alternately connecting to a common pick-up channel the output of said storage means of said respective pick-up channels for producing a continuousl flow of time-compressed signals in said common channel;

filter means for separating the carrier modulated luminance signal component and likewise the chrominance signal component;

means for demodulating said carrier modulated luminance signal and for frequency shifting said chrominance signal component to the normal chrominance signal frequency, and adding circuit means for combining the demodulated luminance signal component and the normal frequency chrominance signal component to produce a normal composite color television signal.

14. Apparatus for recording color television signals on a magnetic tape by the method set forth in claim 3 and for reproducing color television signals so recorded on a magnetic tape, comprising:

filter means for separating the luminance and chrominance components of a television signal;

encoding means for time compressing at least the chrominance component and for time displacing said chrominance component of each television line into an adjacent line blanking interval of the luminance component;

means for modulating the output of said encoding means onto a carrier frequency to produce a modulated wave signal;

first switching means for subdiving said modulated wave signal and distributing segments thereof of equal duration alternately to first and second recording channels;

storage means for time-expanding the signals in said first and second recording channels;

first switching means for subdiving said modulated wave signal and distributing segments thereof of equal duration alternately to first and second recording channels;

storage means for time-expanding the signals in said first and second recording channels for frequency reduction thereof;

magnet heads for each of said channels for recording the frequency reduced signals on a moving tape;

second switching means for switching over from recording to reproducing mode of operation;

first and second pick-up channels for connection to said magnet head through said second switching means in the pickup mode of operation;

storage means in each of said pickup channels for time-compressing the signals in said pick-up channels for frequency increase which is reciprocal to the frequency reduction in recording;

third switching means for alternately connecting to a common pick-up channel the output of said storage means of said respective pick-up channels for producing a continuous flow of time-compressed signals in said common channel;

decoding means for separating the chrominance component segments situated in the blanking intervals of the encoded luminance component, and for time-expanding at least said chrominance component segments and displacing said expanded chrominance component segments for coextensive superposition on said luminance component, and means for superposing said expanded chrominance component on the corresponding luminance component segments of the signal being decoded in order to produce a normal composite color television signal.

15. Apparatus for recording color television signals on and from a magnetic tape by the method set forth in claim 5 and for reproducing color television signals so recorded on a magnetic tape, comprising:

filter means for separating the luminance chrominance components of a television signal;

frequency converter means for shifting the frequency of said chrominance component to a region adjoining the lower frequency boundary to be provided for said luminance signal;

first switching means for subdividing individually said separated luminance and frequency shifted chrominance components of said television signal and distributing segments of each having equal duration alternately to first and second recording channels individual to said luminance and frequency shifted chrominance components;

storage means for time-expanding the signals in said first and second channels of said subdivided luminance and said subdivided frequency shifted chrominance components for frequency reduction thereof;

modulating means for modulating the time-expanded signal segments of said luminance component in said first and second channels onto a carrier frequency;

signal adding means for combining the modulated time-expanded luminance component and the corresponding time-expanded chrominance component of each channel for providing combined television channel signals in each channel;

magnet heads for each of said channels for recording said comnbined time-expanded television signals on a moving tape;

second switching means for switching over from recording to reproducing modes of operation;

first and second pick-up channels for connection said magnets heads through said second switching means and pickup mode of operation;

second filter means for separating the combined television signals picked up in said channels into luminance and chrominance components;

demodulating means for demodulating said luminance components;

storage and time-compressing means for subjecting both said demodulated luminance components and said chrominance components to time-compression in each channel which is the reciprocal of time-expansion used in recording;

third switching means for alternately connecting to a first common pick-up channel the output of said storage and time-compression means for said demodulated luminance components and for alternately connecting to a second common pick-up channel the output of said storage and time-compression means for said demodulated luminance component;

frequency converter means for shifting the frequency of said chrominance component of said second common pick-up channel to the normal frequency of said component when in a standard composite color television signal, and signal adding means for combining said frequency shifted chrominance component at normal frequency and said demodulated luminance component to produce at the output thereof a normal composite color television signal.

16. Apparatus for recording color television signals a magnetic tape by the method set forth in 5 and for reproducing color television signals so recorded from a magnetic tape, comprising:

filter means for separating the luminance and chrominance components of a color television signal;

encoding means for time-compressing at least the chrominance component and then time-displacing said chrominance component of each television line into an adjacent line blanking interval of the luminance component to produce a combined encoded signal;

first switching means for subdividing the combined encoded signal and distributing segments thereof of equal duration alternately to first and second recording channels;

storage means for expanding the signals in said first and second recording channels for frequency reduction thereof;

modulating means for modulating the time-expanded signals in said first and second channels onto a carrier frequency separately;

magnet heads for each of said channels for recording the modulated time-expanded signals on a moving tape;

second switching means for switching over from recording to reproducing mode of operation;

first and second pick-up channels for connection to said magnet heads through said second switching means in the pick-up mode of operation;

demodulating means for demodulating the picked-up signals in said first and second pick-up channels separately;

storage means in each of said pick-up channels for time-compressing the signals in said pick-up channels for frequency increase which is reciprocal to the frequency reduction in recording;

third switching means for alternately connecting to a common pick-up channel the output of said storage means of said respective pick-up channels for producing a continuous flow of time-compressed signals in said common channel;

decoding means for decoding the time-compressed signals in said common channel by time division separation of the chrominance component segments of said time-compressed signals situated in the blanking intervals of the luminance component, time-expanding at least said chrominance component segments and time-displacing said expanded chrominance component segments for superposition on said luminance component, and signal adding means for combining, by superposition, said time expanded chrominance component segments with corresponding luminance component segments to produce another composite color television signal.

17. Apparatus for recording and reproducing color television signals as defined in claim 13, 14, 15 or 16 in which the rate of operation of said first and third switching means is such as to provide, in the case of said first switching means, and to sequence, in the case of said third switching means, signal segments corresponding to a television line scan interval.

18. Apparatus for recording and reproducing color television signals on and from a magnetic tape as defined in claim 13, 14, 15 or 16 in which said first and third switching means have a rate of operation such as to subdivide, in the case of said first switching means, and to sequence, in the case of said third switching means signal segments corresponding to television picture points, and in which apparatus said storage means are constituted as sample and hold circuits.

19. Apparatus as defined in claim 13, 14, 15 or 16 in which there is provided for each recording and pickup channel a pair of diametrically opposite magnetic heads, said pairs of heads being mounted on a common pickup wheel with a slight axial offset between the pairs as well as a slight circumferential offset, the core gaps of the heads of different pairs having an angular mutual offset for providing azimuth damping for reducing crosstalk between channels.

* * * * *